Dec. 17, 1929.  J. DOLAN  1,739,714
SAFETY DEVICE FOR STREET CARS AND SIMILAR VEHICLES
Filed Sept. 14, 1926  2 Sheets-Sheet 1
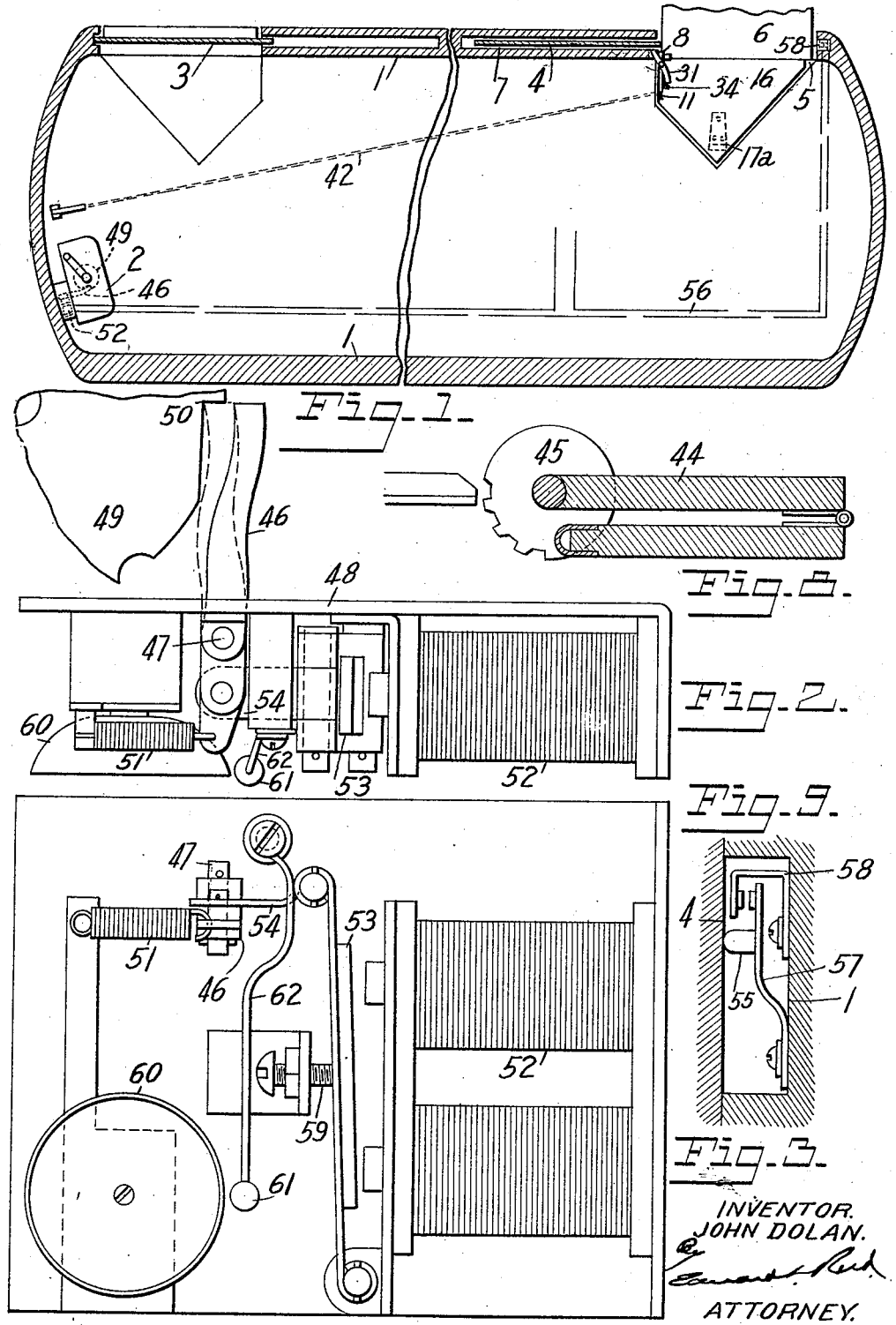
INVENTOR.
JOHN DOLAN.
ATTORNEY.

Dec. 17, 1929.  J. DOLAN  1,739,714
SAFETY DEVICE FOR STREET CARS AND SIMILAR VEHICLES
Filed Sept. 14, 1926  2 Sheets-Sheet 2
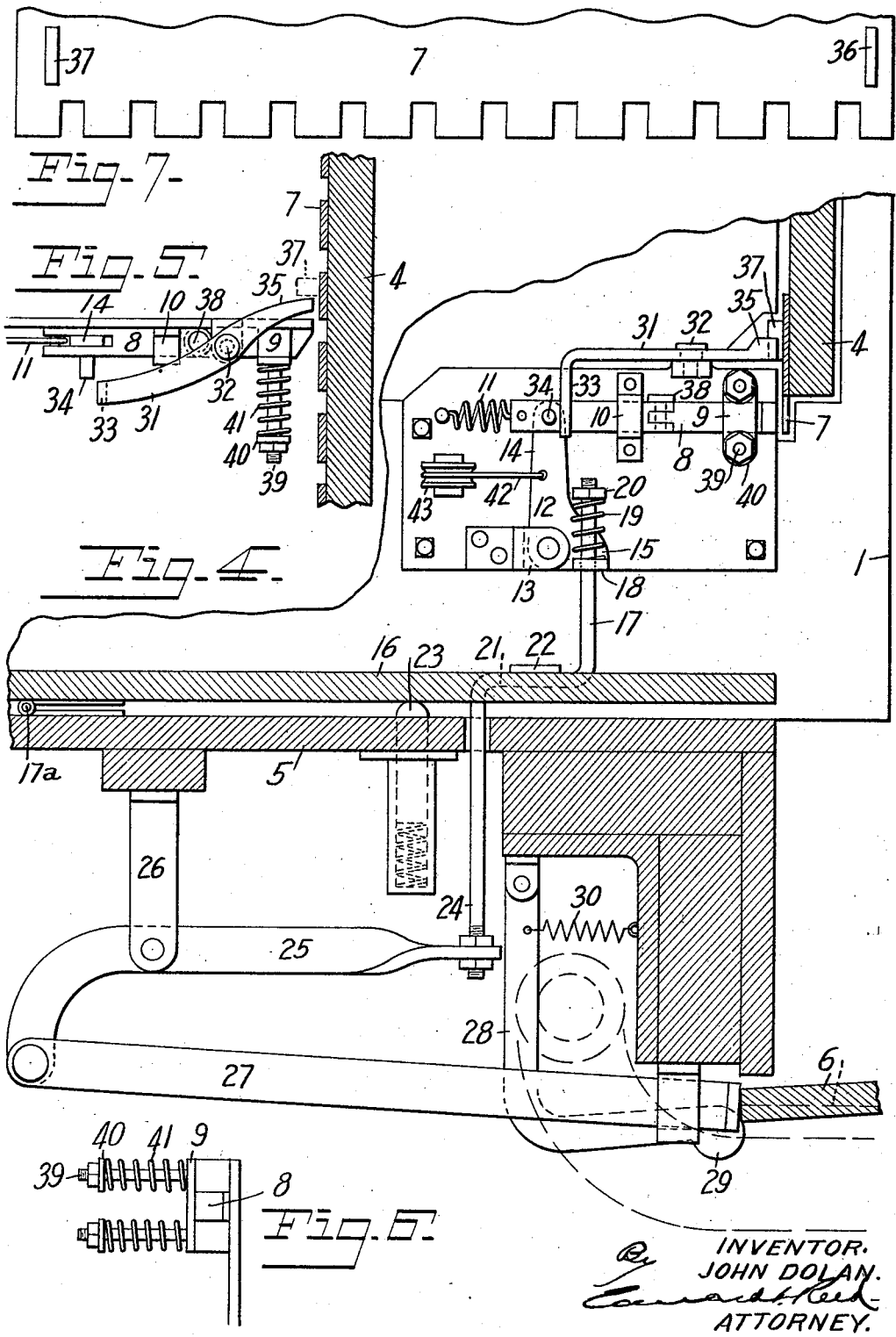
INVENTOR.
JOHN DOLAN.
ATTORNEY.

Patented Dec. 17, 1929

1,739,714

UNITED STATES PATENT OFFICE

JOHN DOLAN, OF DAYTON, OHIO

SAFETY DEVICE FOR STREET CARS AND SIMILAR VEHICLES

Application filed September 14, 1926. Serial No. 135,453.

This invention relates to safety devices for street cars and similar vehicles, and is designed more particularly for use on street cars of the type known as one man cars. In this type of car the motorman at the front end of the car has complete charge both of the operation of the car and of the opening and closing of the doors to permit of the entrance and discharge of passengers. The motorman cannot, from his station, see the rear platform and step and in the opening and closing of the rear door he is guided wholly by a system of mirrors by which he determines the position of the passengers with relation to the platform and step. Either because of the motorman's inability to see passengers entering or leaving the car or through inadvertence he will sometimes start the car while passengers are on the step or platform, or will close the door so quickly as to cause it to strike a passenger who is leaving the car or to catch the clothing of the passenger and grip the same so that the passenger is held to the car and is sometimes dragged by the car when the latter is started.

One object of the invention is to provide means which will be controlled by a passenger entering or leaving the car and will prevent the door from being closed until the passenger has left both the platform and the step.

A further object of the invention is to provide means for preventing the motorman from starting the car so long as the door is open; and further to prevent the starting of the car so long as the passenger is on the platform or step.

A further object of the invention is to provide such a mechanism which will be simple in its construction, positive in its operation and which may be installed on a car at a relatively low cost.

Other objects of the invention will appear as the mechanism is described in detail.

In the accompanying drawings Fig. 1 is a floor plan of a street car having doors at both the front and rear ends thereof; Fig. 2 is a plan view of a controller lock; Fig. 3 is a side elevation of the controller lock; Fig. 4 is a sectional view taken vertically through a portion of the car and showing the door controlling mechanism in elevation; Fig. 5 is a plan view of the latch, showing a portion of the door in section; Fig. 6 is an end elevation of the latch; Fig. 7 is a detail view, partly broken away, of the toothed locking member for a sliding door; Fig. 8 is a detail view of the toothed locking member for a swinging door, showing the door in section; and Fig. 9 is a detail of the door operated switch.

In these drawings I have illustrated one embodiment of my invention and have shown the same as applied to the rear door only of a two door car but it will be understood that the invention may be applied to either or both doors as may be desired. I have also shown the car as equipped with both a passenger controlled door lock and a controller lock, as by the use of these two devices the controller lock is under the control of a passenger entering or leaving the car, but it will be understood that either a controller lock or the door lock may be used independently of the other. Further, I wish it to be understood that while I have shown one embodiment of the mechanism for the purpose of illustration the various parts of the apparatus may take various forms and may be arranged in various positions with relation one to the other without departing from the spirit of the invention.

In that embodiment of the invention here illustrated the apparatus is applied to a one man street car of the usual type and which comprises a body portion 1 having the controller 2 at the forward end thereof and having front and rear doors 3 and 4 which, in the present instance, are sliding doors. These doors are opened and closed by the motorman at the forward end of the car through the usual or any suitable mechanism, such as a system of levers or a compressed air device. Inasmuch as the means for opening and closing the doors forms no part of the present invention I have not illustrated the same. The floor of the car extends on the same level to the rear end of the car and adjacent to the rear doorway the floor is provided with a depressed portion or well which forms a platform 5 upon which a passenger steps upon entering or leaving the car. This platform is arranged entirely within the car but constitutes in effect an upper step. A lower step 6 is arranged on the outside of the car and is so connected with the door operating mechanism that it will be folded against the side of the car when the door is closed but will be lowered to its operative position when the door is opened, this mechanism being common to street cars of this type.

In order to prevent the door being closed when a passenger is entering or leaving the car I have provided means for locking the door in its open position whenever a passenger is on the platform 5 or step 6. As here shown, I have connected with the door a locking member which, in the case of a sliding door, is preferably in the form of a toothed bar 7 which is rigidly secured to the lower portion of the door and the teeth of which project below the lower edge of the door. Cooperating with this locking member is a second locking member, here shown in the form of a latch 8, movably mounted upon a fixed part of the car and, in the present instance, slidably mounted in guideways 9 and 10 mounted on the front end of the well or depressed portion above the platform 5. A spring 11 acts upon the latch to retract the same and hold it normally in its inoperative position, that is, with its nose out of the path of the toothed bar on the door. A lever 12 is pivotally mounted on the car adjacent to the latch and is operatively connected with the latch to move the same against the tension of the spring 11 into a position in which it will be engaged by the locking member on the door and will check the movement of the door. As here shown this lever is in the form of a bell crank lever pivotally mounted on a bracket 13 and having its upper arm 14 pivotally connected with the latch bar. The other arm 15 of the lever is connected with a device arranged in the path of a passenger entering or leaving the car through the rear doorway so that the lever will be operated by the passenger, this device being, preferably, in the form of a yieldable treadle or platform. In the present construction, I have mounted above the platform 5 a supplemental platform or treadle 16 which is preferably of a size and shape substantially corresponding to the size and shape of the platform 5 and is pivotally connected thereto near its rear end, as shown at 17ᵃ. Operatively connected with the treadle is a connecting member, such as a rod 17, the upper portion of which extends through an apertured ear 18 carried by the arm 15 of the lever 12 and is so connected with said arm that the movement of the rod will be transmitted to the lever. For reasons which will hereinafter appear I prefer that the connection between the rod and the lever shall be a yieldable one and I have therefore shown a spring 19 coiled about the rod and confined between the ear 18 of the lever and a stop or nut 20 secured to the upper end of the rod. The rod may be connected with the treadle in any suitable manner but, as here shown, it has a laterally offset portion 21 which is arranged at one edge of the treadle and is caused to move downwardly with the treadle by a projection or plate 22 secured to the treadle and overhanging the offset portion of the rod. The treadle 16 is yieldably supported out of contact with the platform 5 so that it will be moved downwardly by the weight of a passenger stepping onto the same. As is here shown, a spring pressed plunger 23 extends through the platform 5 and supports the treadle normally in a slightly elevated position but permits the same to yield under the weight of a passenger, either large or small. It will be apparent, therefore, that when a passenger steps upon the treadle 16 the treadle and the connecting rod 17 will move downward, thus rocking the lever 12 about its axis and projecting the nose of the latch bar 8 into the path of the locking member 7 on the door. Should the nose of the latch strike one of the teeth on the locking member the spring 19 will yield to permit the treadle to complete its movement under the weight of the passenger and as soon as the door has moved in either direction a distance sufficient to bring one of the spaces between the teeth into line with the latch the expansion of the spring 19 will complete the movement of the latch into its locking position.

The latch is operated not only by the treadle 16 but also by the step 6, which constitutes a treadle. To this end the lower end portion 24 of the connecting rod 17 extends through the platform 5 and is connected at its lower end with one end of a lever 25 which is pivotally mounted between its ends on a bracket 26. The other end of the lever 25 is connected with the inner end of a thrust rod 27, the outer end of which is arranged to be engaged by the lower or inner edge of the step or lower treadle 6 when the latter is moved into its operative position. Thus when the step is forced downward it will impart rearward movement to the thrust bar 27 which will be transmitted through the lever 25 to the connecting rod 17. The step 6 may be held normally in a slightly elevated position by means of a bent arm 28 which is pivotally connected at its upper end to a fixed part of the car and has a lower outwardly extending portion provided with a head 29 which bears against the inner edge of the step. A spring 30 acting on the arm 28 is of sufficient strength to slightly elevate the step but will yield under the weight of a passenger to permit the step to assume its lowermost position. Thus when either the step 6 or the treadle 16 is subjected to the weight of a passenger the latch 8 will be held in its operative position and will prevent the door from being closed. When a passenger who is leaving the car steps on the treadle 16 the lever 25 will retract the thrust rod 27 and when the passenger steps from the treadle 16 onto the step 6 the step merely retains the thrust rod in its retracted position without imparting additional movement thereto. A passenger entering the car will, of course, depress the step 6 first, thus actuating the lock, and will then step on the treadle 16 which will retain the lock in its operative position. When the mechanism is located at a doorway which serves as an exit only it is not essential that the step 6 should be supported in an elevated position after the treadle has been depressed and by omitting the arm 28 and spring 30 the step will be permitted to move to its lowermost position when the treadle 16 is depressed and consequently the step will not yield under the weight of the passenger.

In case a passenger steps upon the treadle 16 before the door is opened the latch will be moved to its operative position and the forwardly beveled nose of the latch will ride over the teeth of the locking member 7 as the door is moved to its open position and will not interfere with the opening of the door. However, the contact of the latch with the toothed bar would be noisy and would subject the mechanism to unnecessary wear and I have, as here shown, provided means which will hold the latch in its inoperative position until the door has been opened. To this end I have mounted above the latch 8 a lever 31 which is pivotally mounted between its ends on a vertical axis, as shown at 32 and has at its inner end a downwardly extending part or finger 33 which lies in the path of a pin 34 carried by the latch bar 8. In the present instance, this pin or stop 34 is an extension of the pivot pin which connects the lever 12 with the latch bar. The outer end 35 of the lever 31 projects into the path of two stops, 36 and 37, carried by the door and, in the present instance, secured to the locking member 7 near the opposite ends thereof. When the door is moved to its closed position the rear stop or projection 37 will engage the lever 35 and move the finger 33 thereof into the path of the pin 34, thus holding the latch in its retracted position. When the door is moved toward its open position the forward stop or projection 36 will engage the lever and move the finger 33 out of the path of the pin 34, thereby releasing the latch bar and permitting it to move to its operative position.

In case a passenger steps upon one of the treadles while the finger 33 is in the path of the pin 34 the pin will be caused to engage the finger but the spring 19 on the connecting rod 17 will yield to permit the rod to continue its movement with the treadle and when the latch is released this spring will expand and complete the movement of the latch bar. I have also provided means for cushioning the latch bar against the impact of the door. To this end the latch bar is formed in two parts which are pivotally connected one to the other, as shown at 38. The outer wall of the guide 9, in which the outer end of the latch bar is mounted, is in the form of a plate which is slidably mounted upon two guide rods 39 and confined between this plate and stops 40 at the outer ends of the rods are springs 41 which serve to hold the outer wall of the guide 9 normally in its innermost position but which will yield when the latch is subjected to a severe impact but will not yield sufficiently to permit the latch to move out of the path of the locking bar 7.

It sometimes happens that a passenger will remain standing on the platform or treadle 16 when the door is open, although the passenger does not wish to leave the car. To permit the door to be closed under such circumstances I have connected with the lever 12 a cable 42 which extends about a suitable guide 43 and extends forwardly to a point near the motorman's station so that he can through this cable retract the latch and permit the door to close even though the treadle 16 is depressed. While I have shown the locking member which is connected with the door as having a plurality of teeth it will be obvious that the locking member may comprise a single tooth or projection or that the latch may engage the edge of the door itself. However, under such conditions the door could be locked only when in its fully retracted position while with the toothed bar it can be locked in various positions and should a passenger step upon the treadle after the door had begun to close the latch will operate to check the further movement of the door.

In some instances cars of this type are provided with swinging doors, as shown at 44, in Fig. 8, and in order to apply the invention to such a door it is only necessary to substitute for the toothed bar 7 a toothed disk 45 which is rigidly secured to the door at the axis thereof so that it will be rotated as the door is moved toward and from its open position. The latch 8 cooperates with this toothed locking member 45 in the same manner that it cooperates with the bar 7.

The means for preventing the car from being started while a passenger is entering or leaving the same comprises a controller lock which is held in its operative position whenever the door is open, and inasmuch as the door cannot be closed so long as a passenger is on either of the treadles the car cannot be started so long as the passenger is on either of the treadles. The device may take various forms but, as here shown, it comprises a locking arm or lever 46 which is pivotally mounted at 47 on a supporting frame 48 which in turn is mounted upon the wall of the controller 2 so that the arm will extend into the controller through a suitable opening therein. The locking arm 46 may engage any suitable locking member which is connected with the controller handle but, in the present instance, I have utilized the usual disk 49, which is rigidly secured to the shaft for the controller handle, and to this end have provided this disk with a notch 50 which is so arranged that when the handle is in its "off" or neutral position the notch will lie in the path of the end of the locking arm 46 and this arm may be moved into that notch so that it will prevent movement of the controller handle. A spring 51 connected with the other end of the locking arm tends to hold the latter normally in an inoperative position. Mounted on the supporting frame 48 is an electromagnet 52, the armature 53 of which is connected, by an arm 54, with the locking arm 46 so that when the magnet is energized the locking arm will be moved to its operative position. In the present instance, I have shown a double coil magnet having a single armature for the two coils, which is pivotally supported beneath the lower coil. As a result when the magnet is deenergized the lower portion of the armature is spaced from the lower coil of the magnet a distance less than the distance the upper portion of the armature is spaced from the upper coil of the magnet. Consequently a strong initial pull is exerted on the lower portion of the armature and this pull is continued as the upper portion of the armature approaches the magnet. In this manner a powerful pull of long duration is secured and such a magnet requires much less current than would be required by a single coil magnet to accomplish the same movement. A circuit breaker and closer 55 is interposed in the circuit 56 of the magnet 52 and is so controlled by the movement of the door that the circuit breaker and closer will be closed whenever the door is opened, thus causing the magnet to be energized and the locking arm moved to its operative position. This circuit breaker and closer may be of any suitable character and may be arranged in any suitable location but, as here shown, it is arranged at the rear edge of the doorway and comprises a resilient member 57 which, when unrestrained, will maintain contact with the fixed member 58 of the switch. The resilient member 57 has a part which extends into the path of the door 4 and when this door moves to its closed position the resilient member 47 of the switch will be moved out of contact with the fixed member thereof and the circuit broken, thus de-energizing the magnet and permitting the locking arm to be moved to its inoperative position by the spring 51. A stop 59 limits the movement of the armature 53 by the spring 51.

If desired, a signal may be provided to indicate to the motorman when the controller has been released. To this end I have mounted upon the supporting frame 48 a bell 60 adapted to be engaged by a tapper 61 carried by an arm 62 arranged to be engaged by a part of the armature structure 53 when the latter is moved away from the magnet, thus causing the tapper to engage the bell when the locking arm is moved to its inoperative position.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a car having a doorway, a door therefor, and a platform adjacent to said doorway, a locking member connected with said door, a second locking member movable into locking position with relation to the first mentioned locking member to retain said door in its open position, a part movably mounted adjacent to said platform and arranged to be actuated by a passenger passing through said doorway, an operating device mounted independently of said second locking member and said movable part and operatively connected with said second locking member to move the latter to said locking position, and means actuated by said movable part to control the operation of said operating device.

2. In a car having a doorway and a door therefor, a locking member connected with said door, a second locking member movable into locking position with relation to the first mentioned locking member to retain said door in its open position, a treadle movably supported in the path of a passenger passing through said doorway, an operating device mounted independently of said treadle and said second locking member and operatively connected with said second locking member to move the latter into locking position, and means actuated by said treadle to control the operation of said operating device.

3. In a car having a doorway, and a door therefor, a locking member connected with said door, a second locking member movable into locking position with relation to the first mentioned locking member to retain said door in its open position, means to retain said second locking member normally in an inoperative position, a treadle movably supported in the path of a passenger passing through said doorway, an operating device mounted independently of said second locking member and said treadle and operatively connected with said second locking member to move the latter to said locking position, and means actuated by said treadle to control the operation of said operating member.

4. In a car having a doorway and a slidable door therefor, a locking member carried by said door and having a plurality of parts forming stops, a second locking member movable into and out of a position to engage any one of said stops, a treadle movably supported in the path of a passenger passing through said doorway, and means actuated by said treadle to cause said locking member to be moved to an operative position with relation to said first mentioned locking member.

5. In a car having a doorway and a door therefor, a locking member connected with said door, a second locking member movable into and out of a position to engage the first mentioned locking member, a plurality of treadles arranged in the path of a passenger passing through said doorway, and means operatively connected with each of said treadles to control the movement of said second locking member.

6. In a car having a doorway and a door therefor, and having a platform adjacent to said doorway, a locking member connected with said door, a second locking member movable into and out of a position to engage the first mentioned locking member, a spring to retain said second locking member normally in its inoperative position, a treadle supported by said platform and arranged in the path of a passenger passing through said doorway, and means actuated by said treadle to move said second locking member against the action of said spring in a position to engage the first mentioned locking member.

7. In a car having a doorway and a door therefor, a locking member connected with said door, a second locking member movable into and out of position to engage the first mentioned locking member, a treadle arranged in the path of a passenger passing through said doorway, and a device connected with said treadle and yieldably connected with said second locking member to cause the latter to be actuated by said treadle.

8. In a car having a doorway and a door therefor, a locking member connected with said door, a second locking member movable into and out of a position to engage the first mentioned locking member, a treadle arranged in the path of a passenger passing through said doorway, an actuating lever connected with said second locking member, and a yieldable connection between said actuating lever and said treadle.

9. In a car having a doorway and a door therefor, a locking member connected with said door, a second locking member movable into and out of a position to engage the first mentioned locking member, a treadle arranged in the path of a passenger passing through said doorway, an actuating lever pivotally mounted on a fixed support and connected with said second locking member, and a device to operatively connect said lever with said treadle.

10. In a car having a doorway and a door therefor, a locking member connected with said door, a second locking member movable into and out of a position to engage the first mentioned locking member, a treadle arranged in the path of a passenger passing through said doorway, an actuating lever connected with said second locking member, and a connecting rod secured to said treadle and yieldably connected with said lever.

11. In a car having a doorway and a door therefor, a locking member connected with said door, a second locking member movable into and out of a position to engage said first mentioned locking member, a plurality of treadles arranged in the path of a passenger passing through said doorway, an actuating lever connected with said second locking member, a rod yieldably connected with said lever, and means for connecting said rod with a plurality of said treadles whereby the depression of either treadle will actuate said second locking member.

12. In a car having a doorway, and a door therefor, and having a treadle and a step arranged adjacent to said doorway, a locking member connected with said door, a second locking member movable into and out of a position to engage the first mentioned locking member, an actuating lever connected with said second locking member, a rod connected with said actuating lever, secured to said treadle and extending downwardly therefrom, a lever connected with the lower end of said rod, and means arranged to be actuated by said step for imparting movement to said rod when said step is depressed.

13. In a car having a doorway and a door therefor, and having a treadle and a step arranged adjacent to said doorway, a locking member connected with said door, a second locking member movable into and out of a position to engage the first mentioned locking member, an actuating lever connected with said second locking member, a rod connected with said actuating lever, secured to said treadle and extending downwardly therefrom, a lever connected with the lower end of said rod, and means arranged to be actuated by said step for imparting movement to said rod when said step is depressed, and means for holding said step normally in a slightly elevated position.

14. In a car having a doorway and a door therefor, a locking member connected with said door, a second locking member movable into and out of a position to engage the first mentioned locking member, a treadle arranged in the path of a passenger passing through said doorway, an operative connection between said treadle and said second locking member, means to retain said second locking member in its inoperative position when said treadle is depressed, and means controlled by the movement of said door to release said second locking member.

15. In a car having a doorway and a door therefor, a locking member connected with said door, a latch bar mounted for sliding movement into and out of the path of the first mentioned locking member, a spring to retract said latch, a treadle arranged in the path of the passenger passing through said doorway, means actuated by said treadle for moving said latch bar against the action of said spring, a stop carried by said latch bar, a lever pivotally mounted adjacent to said latch bar, having at one end a part movable into and out of the path of said stop and having its other end arranged adjacent to said door, and parts movable with said door to actuate said lever to move the first mentioned lever into and out of the path of said stop.

16. In a car having a doorway and a door therefor, a locking member connected with said door, a latch bar slidably mounted for movement into and out of the path of said locking member, the forward portion of said latch bar being movable transversely to the length thereof, yieldable means to resist the transverse movement of said portion of said latch bar, a treadle arranged in the path of a passenger passing through said doorway, and means actuated by said treadle for controlling the sliding movement of said latch bar.

17. In a car having a doorway and a door therefor, a locking member connected with said door, a second locking member movable into and out of operative position with relation to said first mentioned locking member, a treadle arranged in the path of a passenger passing through said doorway, an operative connection between said treadle and said second locking member to cause the latter to be moved to an operative position when said treadle is depressed, and means for retracting said second locking member while said treadle is depressed.

18. In a car having a doorway, a door to close said doorway, and means to control the operation of said car, a device to hold said controlling means against operation, means controlled by the movement of said door to actuate said device, a treadle arranged in the path of a passenger passing through said doorway, and means actuated by the treadle to control the movement of said door.

19. In a car having a doorway, a door to close said doorway, and means to control the operation of said car, a device to hold said controlling means against operation, an electromagnet for moving said holding device into its operative position, a switch interposed in said circuit and so arranged with relation to said door that the switch will be closed when the door is opened and opened when the door is closed, a treadle arranged in the path of a passenger passing through said doorway, and means actuated by said treadle to prevent the closing of said door.

20. In a car having a doorway, a door to close said doorway and means to control the operation of said car, a locking member connected with said door, a second locking member movable into and out of position to engage the first mentioned locking member, a treadle arranged in the path of a passenger passing through said doorway, means connected with said treadle for actuating said second locking member, a device movable into and out of a position to lock said controlling means against operation, an electromagnet operatively connected with said device, a switch connected in a circuit with said magnet and so arranged with relation to said door that the circuit through said magnet will be broken when said door is closed and said circuit will be closed when said door is opened.

21. In a car having a doorway, a door therefor, a controller comprising a handle, and a disk rigidly secured to said handle and provided with a notch in the periphery thereof, a pivoted locking member having one end arranged to be moved into the notch in said disk when said handle is in its neutral position, a spring acting on said arm to move the same out of said notch, an electromagnet comprising an armature, an operative connection between said armature and said locking arm to cause said arm to be moved into the notch in said disk when said magnet is energized, and means controlled by said door to close the circuit through said magnet when said door is in its open position and to break said circuit when said door is in its closed position.

22. In a car having a doorway, a door therefor, a controller comprising a handle and a disk rigidly secured to said handle and provided with a notch in the periphery thereof, a pivoted locking member having one end arranged to be moved into the notch in said disk when said handle is in its neutral position, a spring acting on said arm to move the same out of said notch, an electromagnet comprising an armature, an operative connection between said armature and said locking arm to cause said arm to be moved into the notch in said disk when said magnet is energized, means controlled by said door to close the circuit through said magnet when said door is in its open position and to break said circuit when said door is in its closed position, a signal associated with said locking arm, and means for actuating said signal when said locking arm is moved to its inoperative position.

23. In a car having a door and a controller to control the operation of said car, a device movable into and out of a position to retain said controller in a neutral position, a magnet comprising two coils, a pivoted armature common to both coils of said magnet, and an operative connection between said armature and said retaining device, a circuit breaker and closer for said magnet, and means controlled by said door to operate said circuit breaker and closer.

24. In a car having a doorway and a door therefor, a locking device to hold said door in its open position, a platform treadle operatively connected with said locking device, a step having a movable tread, and means controlled by said step to retain said locking device in the position to which it has been moved by said treadle.

25. In a car having a doorway and a door therefor, a locking device to hold said door in its open position, a treadle operatively connected with said locking device, a step having a movable tread, and means for connecting the tread of said step with said treadle, said connecting means being so arranged that the downward movement of said treadle will actuate the connecting means to permit the tread of said step to move to its lowermost position.

26. In a car having a doorway and a door therefor, a locking device to hold said door in its open position, a treadle operatively connected with said locking device, a step having a movable tread, a movable member arranged in the path of the tread of said step, and means actuated by said treadle to move said movable member and permit the downward movement of said tread.

27. Street car exit door controlling mechanism consisting in a sliding door, a latching member extended transversely of the door on the door, a plate on the platform adjacent the door and depressible by the weight of a passenger, a part supported on said plate in operable relation with the latching member and yieldingly responsive thereto in the movements of the door, and means engaging said part as the plate is depressed for effecting unyielding engagement thereof with the latching member and preventing closing of the door.

28. Street car exit door controlling mechanism consisting in a latching member on the door extending transversely of the door, a plate on the platform adjacent the door depressible by the weight of a passenger, a part supported on said plate in operable relation with the latching member and yieldingly responsive thereto in the movement of the door, means engaging said part as said plate is depressed for effecting unyielding engagement thereof with the latching member and preventing closing of the door, a movable car step and connections between the step and said plate holding the plate depressed as the weight of the passenger is transferred to the step.

In testimony whereof, I affix my signature hereto.

JOHN DOLAN.